United States Patent
Heyworth

[11] Patent Number: 5,464,110
[45] Date of Patent: Nov. 7, 1995

[54] DOUBLE SIDED CONTAINER CLOSURE AND COOPERATING CONTAINER

[76] Inventor: Richard G. Heyworth, 115-2020 Comox Street, Vancouver, Canada, V6G 1R9

[21] Appl. No.: 277,091

[22] Filed: Jul. 19, 1994

[51] Int. Cl.[6] ............................ B65D 41/04; B65D 41/18
[52] U.S. Cl. ......................... 215/223; 215/225; 215/228; 215/329; 220/212
[58] Field of Search ...................................... 215/206, 223, 215/224, 225, 228, 321, 329; 220/287, 212

[56] References Cited

U.S. PATENT DOCUMENTS

| | | |
|---|---|---|
| 3,381,838 | 5/1968 | McClain et al. |
| 3,627,160 | 12/1971 | Horvath. |
| 3,690,496 | 9/1972 | Gibson. |
| 3,794,200 | 2/1974 | Marks. |
| 4,634,013 | 1/1987 | Bar-Kokhba ............................ 215/228 |

*Primary Examiner*—Gary E. Elkins
*Attorney, Agent, or Firm*—Bull, Housser & Tupper

[57] ABSTRACT

An apparatus for containing material, the apparatus including a container and a container closure. The container has a main body portion and a generally cylindrical top portion, the generally cylindrical top portion including a first generally cylindrical closure cooperating portion and a second generally cylindrical closure cooperating portion adjacent the first closure portion. The first closure cooperating portion has a first diameter and a first projecting bead and the second cooperating portion has a second diameter unequal to the first diameter and has a tab cooperating portion. The second cooperating portion also defines an access opening to an interior portion of the container. The container closure includes a body having an axis, the body having first and second cylindrical walls. The first cylindrical wall extends in a first direction about the axis and defines a first receptacle operable to cooperate with the first portion of the container. The first cylindrical wall also has a groove therein for cooperating with the complementary bead on the first portion of the container. The second cylindrical wall extends in a second direction about the axis, the second direction being opposite to the first direction. The second cylindrical wall also defines a second receptacle operable to cooperate with the second portion of the container and has first and second radially inwardly projecting tabs for cooperating with the tab cooperating portion of the second portion of the container.

27 Claims, 4 Drawing Sheets

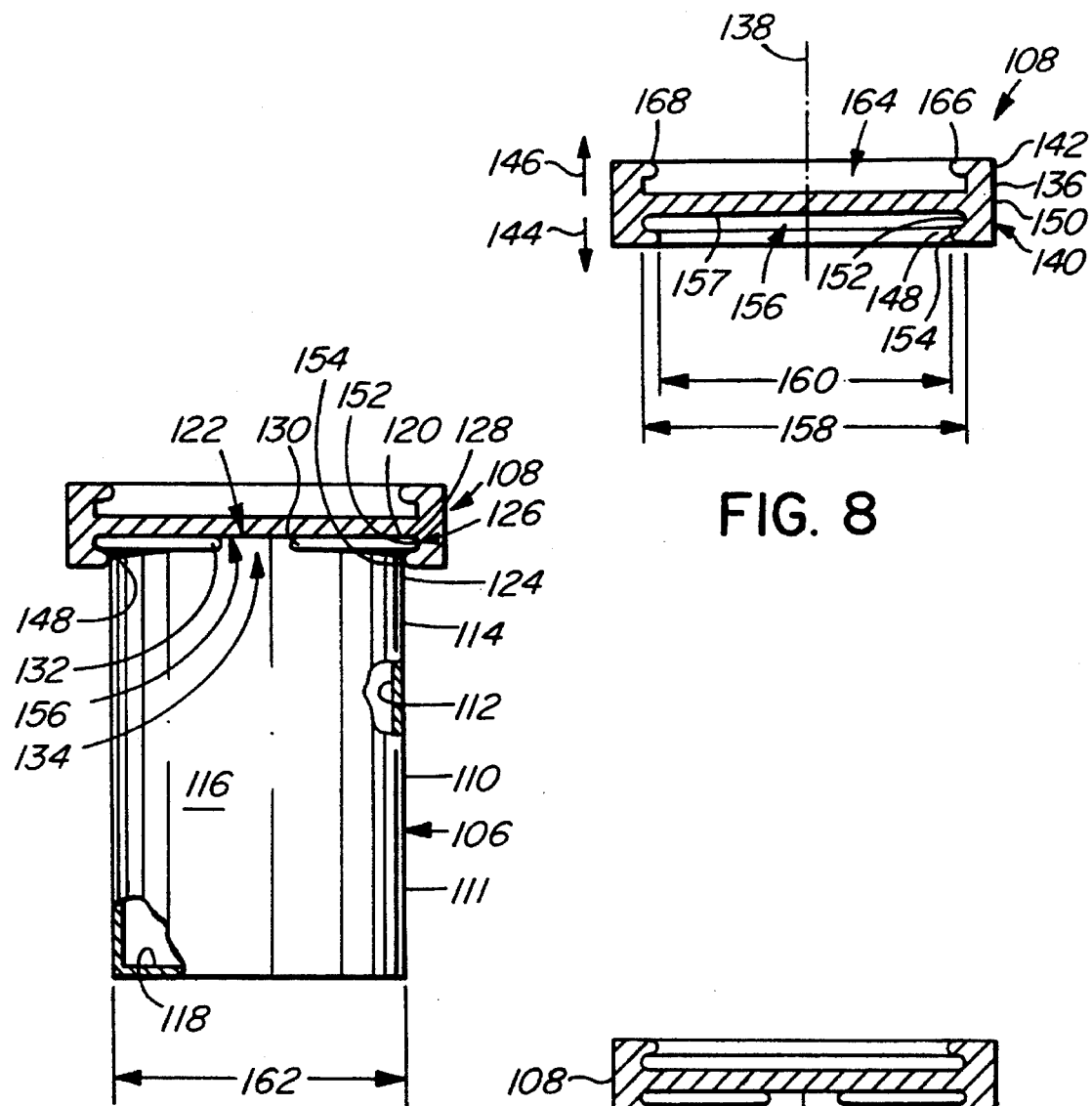
FIG. 8
FIG. 7
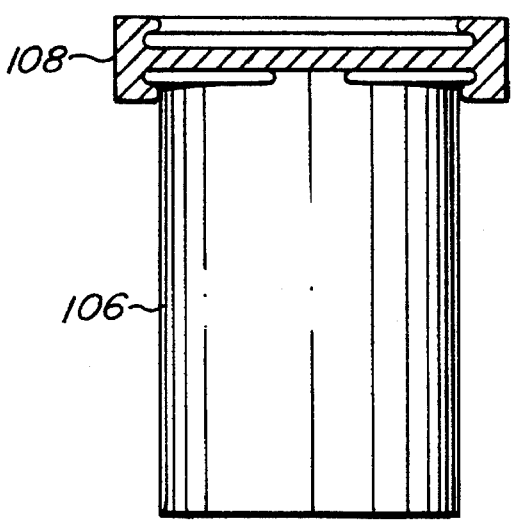
FIG. 9

DOUBLE SIDED CONTAINER CLOSURE AND COOPERATING CONTAINER

BACKGROUND OF THE INVENTION

This invention relates to a container and cooperating container closure having two modes of operation including a child-resistant mode in which the closure is rendered difficult to remove from the container and a conventional mode in which the closure is relatively easy to remove from the container.

Various safety closures for containers are presently in use to prevent children from unauthorized access to potentially dangerous substances such as pills in a pill container. Not all users of pill bottles, however, have children and therefore not all users require child-resistant safety closures. Many of the more common safety closures can be difficult to remove by persons of limited dexterity and strength, such as elderly or infirm persons. To these people, child-resistant safety closures can be frustrating, as they often do not have the strength and dexterity required to operate a child-resistant safety closure.

The manufacturers of potentially dangerous substances seem to have an increasing desire to provide child-resistant closures on nearly every container of such substances, yet often the persons to whom such substances are sold are the elderly or infirm. Thus, the elderly or infirm seem to be unable to escape the widespread use of child-resistant closures.

The present invention attempts to serve the elderly, infirm and those with children by providing a single closure having two modes of operation. In the first mode, the closure is used as a conventional screw-type or snap-on closure and in the second mode the closure is used as a child-resistant closure. Either mode can be selected independently of the other by the user and neither mode requires any complicated special instructions for pushing, pulling or squeezing the closure or container as so many of the conventional child-resistant closures do.

SUMMARY OF THE INVENTION

In accordance with one aspect of the invention, there is provided a double-sided container closure including a body having an axis and first and second cylindrical walls. The first cylindrical wall extends in a first direction about the axis and defines a first receptacle operable to cooperate with a first portion of a container, the first cylindrical wall having a groove therein for cooperating with a complementary bead on the first portion of the container. The second cylindrical wall extends in a second direction about the axis, the second direction being opposite to the first direction, the second cylindrical wall defining a second receptacle operable to cooperate with a second portion of the container, the second cylindrical wall having first and second radially inwardly projecting tabs for cooperating with a tab cooperating portion of the second portion of the container.

In accordance with one aspect of the invention, there is provided an apparatus for containing material, the apparatus including a container and a container closure. The container has a main body portion and a generally cylindrical top portion, the generally cylindrical top portion including a first generally cylindrical closure cooperating portion and a second generally cylindrical closure cooperating portion adjacent the first closure portion. The first closure cooperating portion has a first diameter and a first projecting bead and the second cooperating portion has a second diameter unequal to the first diameter and has a tab cooperating portion. The second cooperating portion also defines an access opening to an interior portion of the container. The container closure includes a body having an axis, the body having first and second cylindrical walls. The first cylindrical wall extends in a first direction about the axis and defines a first receptacle operable to cooperate with the first portion of the container. The first cylindrical wall also has a groove therein for cooperating with the complementary bead on the first portion of the container. The second cylindrical wall extends in a second direction about the axis, the second direction being opposite to the first direction. The second cylindrical wall defines a second receptacle operable to cooperate with the second portion of the container and has first and second radially inwardly projecting tabs for cooperating with the tab cooperating portion of the second portion of the container.

Preferably, the tab cooperating portion includes a second continuous projecting bead extending arcuately about the second closure cooperating portion, the second continuous bead having first and second end portions, the first and second end portions being arcuately spaced apart to form an arcuate gap therebetween and the second continuous projecting bead projecting radially outwardly of the second closure cooperating portion, no further than the first wall portion.

Preferably, the first and second radially inwardly projecting tabs are disposed on diametrically opposite sides of the second cylindrical wall and at least one of the first and second radially inwardly projecting tabs has a generally arcuate shape, and is operable to pass between the first and second end portions of the second continuous bead.

Preferably, at least one of the first and second radially inwardly projecting tabs extends through an angle of approximately 20 degrees and preferably, each of the first and second radially inwardly projecting tabs is relatively rigid and has a thickness approximately equal to the thickness of the second continuous bead.

Preferably, the body is relatively rigid.

Preferably, the first bead is helical to form a male thread on the first closure cooperating portion and the groove is helical in the form of a female thread on the first cylindrical wall, the groove being complementary to the first bead for cooperation therewith.

Optionally, the first projecting bead is annular in shape and is disposed adjacent the access opening and the first groove is annular in shape and generally complementary to the bead.

Preferably, the diameter of the first cylindrical wall is approximately the same diameter as the diameter of the second cylindrical wall.

BRIEF DESCRIPTION OF THE DRAWINGS

In drawings which illustrate embodiments of the invention,

FIG. 7 is a side view of a container and container closure according to a second embodiment of the invention, the closure being mounted on the container in a first, non-child-resistant, snap-on mode of operation, the closure being shown in cross section;

FIG. 8 is a cross sectional view of the closure shown in FIG. 7; and

FIG. 9 is a side view of a container and container closure according to the second embodiment of the invention, the closure being mounted on the container in a second, child-resistant mode of operation, the closure being shown in cross section.

DETAILED DESCRIPTION

Container

Figure 2:
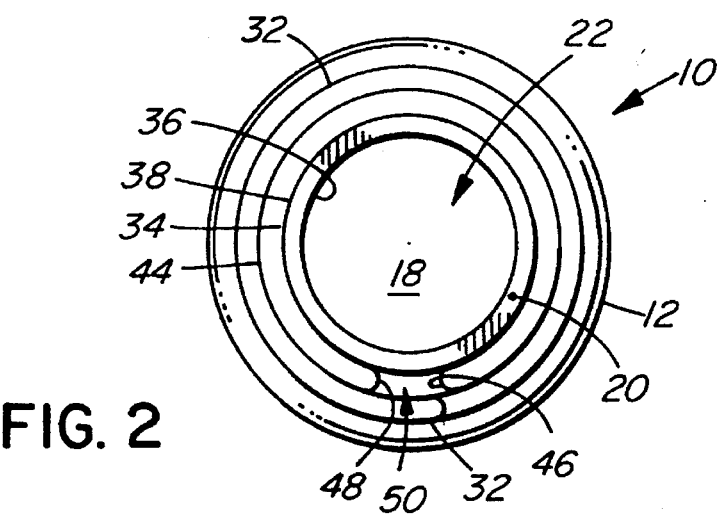
FIG. 2 is a top view of the container of FIG. 1.
Figure 1:
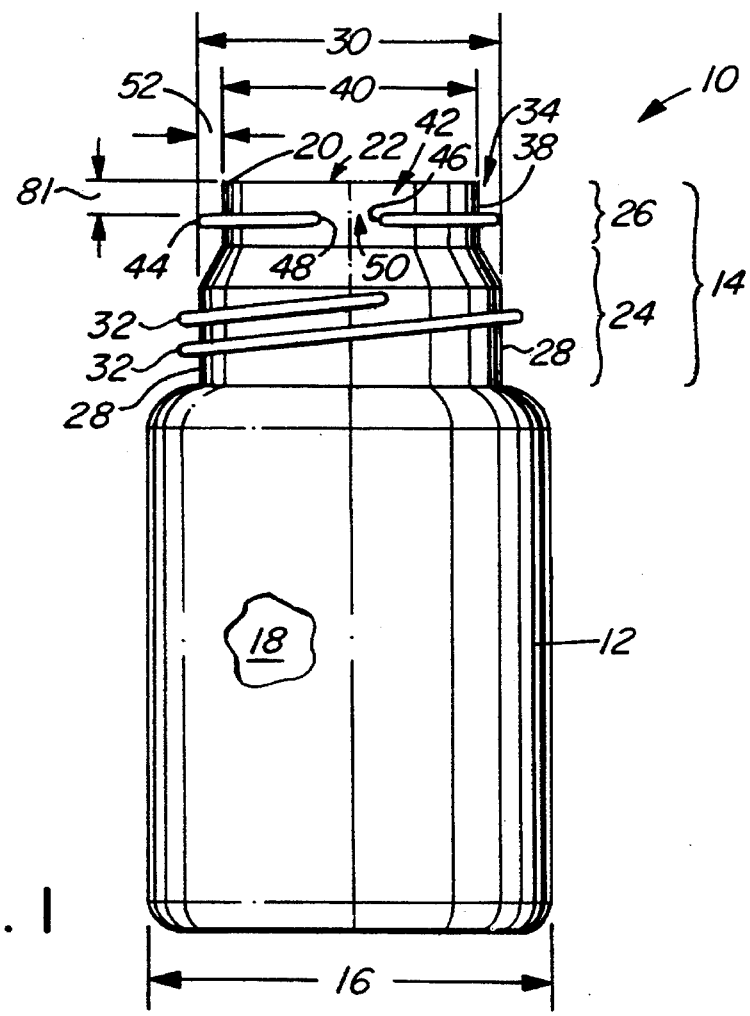
FIG. 1 is a side view of a container according to a first embodiment of the invention.

Referring to FIGS. 1 and 2 a plastic container according to a first embodiment of the invention is shown generally at 10. The container is operable to contain material such as pills or the like.

The container 10 has a main body portion 12 and a generally cylindrical top portion 14. The main body portion is formed from a conventional moulded relatively rigid plastic of the type conventionally used to manufacture conventional pill bottles. The main body portion 12 has a main diameter 16 and generally defines an interior portion 18 of the container, for receiving and holding materials to be contained, while the top portion 14 has an annular edge 20 which defines an access opening 22 to the interior portion 18 of the container 10.

Figure 4:
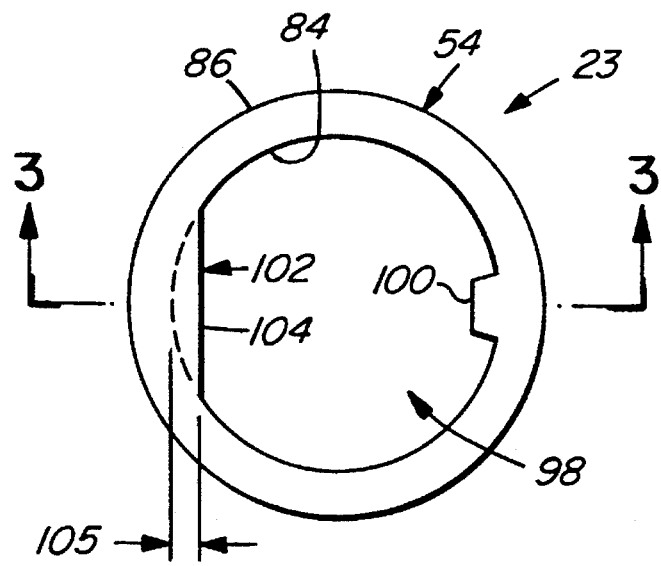
FIG. 4 is a top view of the container closure shown in FIG. 3.
Figure 3:
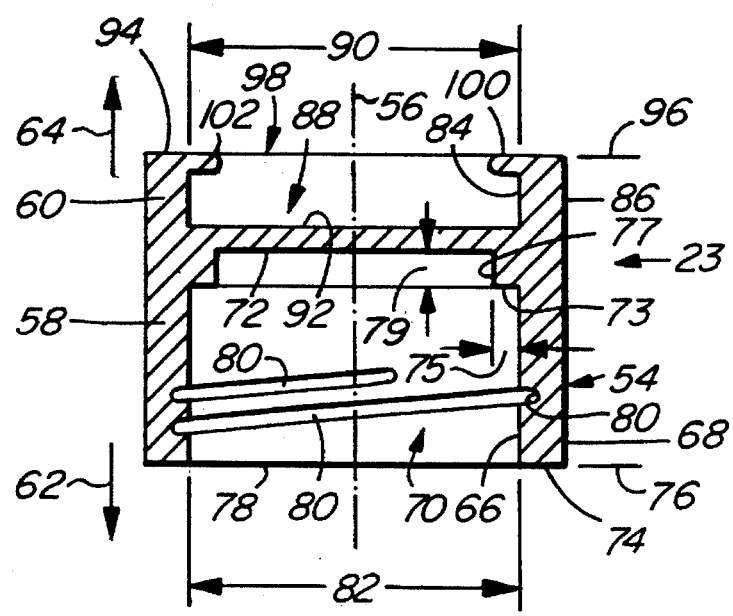
FIG. 3 is a cross-sectional view of a container closure according to the first embodiment of the invention.

The top portion 14 is particularly adapted to cooperate with a cooperating container closure 23 according to the first embodiment of the invention as shown in FIGS. 3 and 4. Referring back to FIGS. 1 and 2, the top portion 14 has first and second generally cylindrical closure cooperating portions 24 and 26. The first portion 24 is disposed adjacent the main body portion and the second portion 26 is disposed adjacent the first portion 24.

The first portion 24 includes a first cylindrical wall portion 28 having a first portion diameter 30 which, in this embodiment is less than the main diameter 16. The relative sizes of the main diameter and the first portion diameter are, however, not important.

The first cylindrical wall portion 28 has a first projecting continuous helical bead 32 which acts as a conventional male thread on the first closure cooperating portion. In one mode of operation, the first projecting helical bead 32 acts to secure the container closure to the container in a conventional screw-top manner.

The second closure cooperating portion 26 has a second wall portion 34 having inner and outer generally cylindrical surfaces 36 and 38 respectively. The inner surface 36 (FIG. 2) generally defines the access opening 22 and the outer surface 38 generally defines a second portion diameter 40 which is less than the first portion diameter 30. The outer surface 38 includes a tab cooperating portion 42, including a second continuous projecting bead 44 which projects radially outwardly of the outer surface 38 and which extends arcuately thereabout. The second bead is continuous but does not extend in a full circle about the outer surface 38, rather, the second bead extends arcuately about the outer surface and has first and second end portions 46 and 48 which are arcuately spaced apart to form an arcuate gap 50 therebetween. Preferably, the angular measure of the arcuate gap 50 is approximately 30 degrees.

In this embodiment, the second continuous projecting bead 44 has a thickness 52 defining the distance it projects radially outwardly of the outer surface 38. The second continuous projecting bead 44 however, must not be so thick as to extend radially outwardly any further than the first wall portion 28 to permit the container closure to cooperate with the first portion 24, in one mode of operation.

Container Closure

Referring to FIGS. 3 and 4, the container closure 23 includes a relatively rigid generally cylindrical body 54 having a longitudinal axis 56. Preferably, the body is formed from conventional relatively rigid plastic material with sufficient flexibility to permit a slight bending of the closure about a diametrical axis perpendicular to the longitudinal axis 56.

The body 54 includes first and second axially extending cylindrical walls 58 and 60. The first wall 58 extends in a first direction 62 about the axis and the second wall 60 extends in a second direction 64 about the axis, the first and second directions being opposite each other.

The first wall 58 has first inner and outer generally cylindrical surfaces 66 and 68. The first inner surface 66 generally defines a first receptacle 70 operable to cooperate with the first portion 24 of the container 10 shown in FIGS. 1 and 2. The first receptacle is further defined by a first disk shaped bottom surface 72 and a first annular outer edge 74 lying in a first plane 76, the first annular outer edge 74 defining a first receptacle opening 78 providing access to the first receptacle 70, into which the first and second portions 24 and 26 of the container 10 of FIGS. 1 and 2 are received in one mode of operation. The first receptacle 70 has a depth defined between the first disk shaped bottom surface 72 and the first annular outer edge 74.

Immediately adjacent the first disk-shaped bottom surface 72, the first receptacle has a shoulder radial surface 73 which extends generally radially inwardly of the first inner cylindrical surface 66 by a shoulder radial distance 75 and has a shoulder axial surface 77 which extends generally parallel to the axis 56, between the shoulder radial surface 73 and the first disk-shaped bottom surface 72 by a shoulder axial distance 79.

The first inner surface 66 has a helical groove 80 therein. The helical groove 80 is complementary in pitch and other dimensions to the first bead 32 on the container 10 shown in FIGS. 1 and 2 and acts as a female thread on the first cylindrical wall 58 for cooperating with the male thread formed by the complementary bead on the first portion of the container. The first inner surface 66 has a first diameter 82 which is generally equal to the first portion diameter 30 of the container 10 shown in FIGS. 1 and 2.

The second cylindrical wall 60 has second inner and outer generally cylindrical surfaces 84 and 86, the inner surface 84 defining a second receptacle 88 having a diameter 90 approximately the same as the first diameter 82. The second receptacle 88 is further defined by a second disk shaped bottom portion 92 and a second outer annular edge 94, the second receptacle having a depth measured between the second disk shaped bottom portion 92 and the second outer annular edge 94. The second outer annular edge 94 lies in a second plane 96 perpendicular to the axis 56 and defines a second receptacle opening 98 lying in the second plane, into which only the second portion 26 of the container 10 of FIGS. 1 and 2 is received, in one mode of operation.

The second cylindrical wall 60 has first and second relatively rigid radially inwardly projecting tabs 100 and 102 for cooperating with the tab cooperating portion 42 of the second portion 26 of the container 10 and permits the second receptacle 88 to cooperate with the second portion 26 of the container 10.

Referring to FIG. 4, the first tab 100 is disposed adjacent the second outer annular edge 94 and projects radially inwardly from the second inner surface 84 by a distance approximately equal to the thickness of the second continuous projecting bead 44 on the container 10. The first tab 100 has a generally arcuate shape and extends arcuately along the second inner surface 84 and subtends an angle of approximately 20 degrees and is operable to pass between the first and second end portions 46 and 48 of the second continuous projecting bead 44 shown in FIG. 1.

Referring back to FIG. 4, the second tab 102 is disposed on the second cylindrical wall, diametrically opposite the first tab 100 and extends chordally across the second inner surface 84. The second tab 102 has a straight chordal portion 104 which projects radially inwardly of the second inner surface 84 by a second distance 105 approximately equal to the thickness 52 of the second continuous projecting bead 44 shown in FIG. 1.

Referring back to FIG. 3, generally, the first outer surface 68 and the second outer surface 86 merge with each other to form one single outer cylindrical surface. The single outer surface may be formed with ridges or may be knurled (not shown) to assist a user of the apparatus in gripping the closure 23.

Operation

Figure 5:
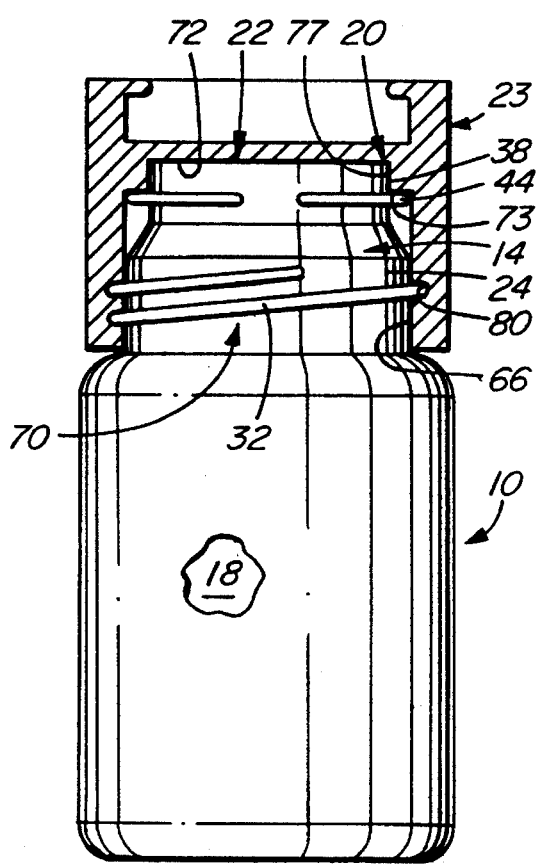
FIG. 5 is a side view of the container shown in FIG. 1 showing the closure of FIG. 3 mounted thereon in a first, non-child-resistant mode of operation, the closure of FIG. 3 being shown in cross section.
Figure 6:
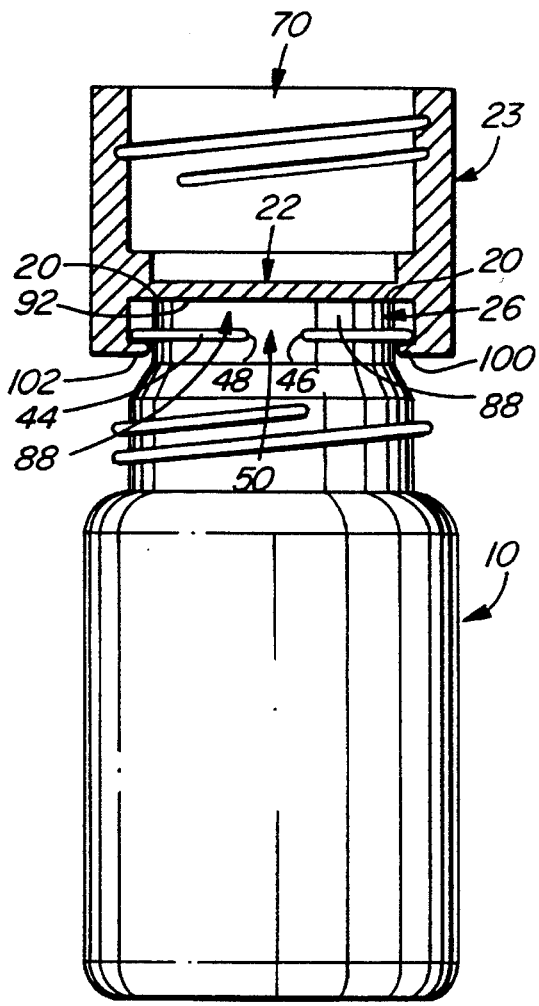
FIG. 6 is a side view of the container shown in FIG. 1 showing the closure of FIG. 3 mounted thereon in a second, child-resistant mode of operation, the closure of FIG. 3 being shown in cross section.

Referring to FIGS. 5 and 6, the double sided container closure 23 has first and second modes of operation shown in FIGS. 5 and 6 respectively. Referring to FIG. 5 the first mode of operation involves receiving the top portion 14 of the container 10 in the first receptacle 70 such that the groove 80 on the first inner surface 66 engages the first bead 32 on the first portion 24 of the container 10. Referring to FIG. 6 the second mode of operation involves receiving the second portion 26 of the container 10 in the second receptacle 88.

Referring back to FIG. 5, in the first mode of operation, the groove 80 and first bead 32 threads are engaged and the container closure 23 is rotated until the annular edge 20 contacts the first disk shaped bottom surface 72. At the same time, the shoulder radial surface 73 contacts the second continuous projecting bead 44 and the shoulder axial surface 77 is closely adjacent the outer surface 38. This effectively seals the opening 22 and prevents contaminants from entering the interior portion 18 of the container 10.

Referring back to FIG. 3, it will be appreciated that it is desirable to make the shoulder radial distance 75 approximately equal to the bead thickness 52 shown in FIG. 1 and that it is desirable to make the shoulder axial distance 79 (FIG. 3) approximately equal to the distance 81 between the bead 44 and the annular edge 20 to effect a good seal between the closure and the container.

It will be further appreciated that in this first mode of operation, the closure 23 acts as a conventional screw-top cap. Removal of the closure is accomplished by rotating the closure relative to the container to disengage the threads in the conventional manner.

Referring to FIG. 6, in the second mode of operation, the container closure 23 is generally oriented such that the second receptacle is axially aligned with the container 10. The container closure is then oriented such that the first tab 100 is aligned with the gap 50. The container closure is then further pressed onto the second end portion 26 until the first tab 100 slides through the gap 50. The container closure 23 is then rotated to the position shown in FIG. 6 where both the first and second tabs 100 and 102 are disposed under the second continuous projecting bead 44, at which point the second disk shaped bottom portion 92 is in contact with the annular edge 20 and the access opening 22 is sealed. The container closure 23 is thus held securely on the container 10. In the second mode of operation, the closure thus acts as a tab alignment type of closure.

In the second mode of operation, to remove the container closure 23, the container closure is rotated relative to the container 10 until the first tab 100 is aligned with the gap 50. The closure 23 is then moved upwardly relative to the container to pass the first tab 100 between the first and second end portions 46 and 48 of the second bead 44 until the tab 100 is clear of the annular edge 20 at which point the second tab 102 is released from the second continuous projecting bead 44 and the closure 23 is free of the container 10.

The first and second receptacles 70 and 88 on the closure 23 permit a single container closure 23 to be used in two modes of operation. In the first mode, the closure acts as a conventional screw-type closure and is easily engaged and disengaged from the container 10 by persons of limited dexterity and strength and by children. In the second mode, the closure 23 acts as a tab alignment-type closure which is more difficult to remove in that a certain skill is required to properly align the closure with the container such that the first tab 100 can pass through the gap 50. In this second mode of operation, the closure is considered child-resistant in that a child will usually lack the intelligence or dexterity required to properly align the tab 100 with the gap 50.

The ability to use the closure 23 in either a child-resistant or non-child-resistant manner allows the user to select the desired mode of operation, in which case only a single closure need be manufactured to suit two applications.

Alternatives

Referring to FIG. 7, a container according to a second embodiment of the invention is shown generally at 106 with a closure shown generally at 108 mounted thereon. In this embodiment, the container 106 has no first portion as in the first embodiment. Rather it has only a single cylindrical wall 110 having single inner and single outer cylindrical surfaces 112 and 114. The single inner cylindrical surface 112 defines an interior portion 116 of the container 106. The interior portion 116 is further defined by a disk shaped bottom portion 118 and an annular edge portion 120, the annular edge portion 120 surrounding an access opening 122 to the container. The outer cylindrical surface 114 portion has a top portion 124 terminated by the annular edge portion 120. Disposed immediately adjacent the annular edge portion 120 is a tab cooperating portion 126. The tab cooperating portion is similar to the second cooperating portion 26 of the first embodiment in that it includes a second continuous projecting bead 128 which projects radially outwardly of an outer surface 111 of the wall 110 and which extends arcuately about the outer surface 111, adjacent the access opening 122. The second bead 128 is continuous, and, as with the second continuous projecting bead 44 described with respect to the first embodiment, does not extend in a full circle about the outer surface 111, but rather, extends arcuately about the outer surface 111 and has first and second end portions 130 and 132 which are arcuately spaced apart to form an arcuate gap 134 therebetween. As in the first embodiment, the angular measure of the arcuate gap 134 is preferably approximately 30 degrees.

Referring to FIG. 8, the container closure 108, according to the second embodiment of the invention, includes a generally cylindrical body 136 having a longitudinal axis 138. As with the first embodiment, preferably, the body 136 is formed from conventional relatively rigid plastic material with sufficient flexibility to permit a slight bending of the closure about a diametrical axis.

The body 136 includes first and second axially extending cylindrical walls 140 and 142 respectively, each having approximately the same diameter. The first wall 140 extends in a first direction 144 about the axis and the second wall 142 extends in a second direction 146 about the axis 138, the first and second directions being opposite each other.

The first wall 140 has first inner and outer surface portions 148 and 150. The first inner surface portion 148 is divided into a concave portion 152 and a convex portion 154 and generally defines a first receptacle 156 operable to cooperate with the closure cooperating portion 126 of the container 106. The concave portion 152 has a diameter 158 and shape complementary to the bead 128 on the container 106 and defines an annular groove on the first wall, the groove being operable to receive the bead in one mode of operation. The annular groove is disposed immediately adjacent the first bottom portion 157 of the first receptacle.

The convex portion 154 has a diameter 160 approximately equal to the diameter 162 of the single wall 110 immediately adjacent the bead 128 and therefore projects radially inwardly of the concave portion 152 such that it is operable to be received under the bead 128 portion 128 when the bead portion is received in the concave portion 152.

The second cylindrical wall 142 defines a second receptacle 164 which is generally the same as the second receptacle 88 described in the first embodiment. The receptacle 164 has first and second tabs 166 and 168 similar to the first and second tabs 100 and 102 of the first embodiment. FIG. 4 may also be considered to depict the plan view of the second receptacle of the second embodiment.

Operation

Referring to FIGS. 7 and 9, the container 106 and container closure 108, according to the second embodiment are operable to provide two modes of operation, namely as a snap-closure and as a tab alignment closure.

Referring to FIG. 7, to use the closure as a snap closure, the closure 108 is oriented to receive the closure cooperating portion 126 in the first receptacle. The closure 108 and container 106 are then pressed together by the user to cause the bead 128 to be received in the concave portion 152, which causes the convex portion 154 to be disposed under the bead 128, thereby securing the closure 108 to the container 106. In this mode of operation, the closure 108 is tightly secured to the container 106. Removal of the closure 108 from the container is achieved by prying the closure 108 off of the container.

Referring to FIG. 9, in the alignment mode of operation, the closure 108 functions in the same manner described with respect to the first embodiment with the closure cooperating portion 126 being received in the second receptacle 164 and the first and second tabs cooperating with the gap 134 and bead 128 respectively to selectively secure and unsecure the closure 108 to the container 106.

As further alternative embodiments, the second receptacles in both the first and second embodiments may be formed in accordance with the closure described in U.S. Pat. No. 3,627,160, Issued Dec. 14, 1971, entitled Safety Cap, and the tab cooperating portion of the container in both embodiments may be formed in accordance with the top portion of the container described in that patent.

While specific embodiments of the invention have been described and illustrated, such embodiments should be considered illustrative of the invention only and not as limiting the invention as construed in accordance with the accompanying claims.

What is claimed is:

1. A double-sided container closure apparatus comprising:
   a) a body having an axis, the body having:
      i) a first cylindrical wall extending in a first direction about said axis and having a first inner surface defining a first receptacle for receiving a portion of a container, said first inner surface having a groove therein said groove being operable to cooperate with a complementary bead on said container, to provide a first mode of holding said apparatus on said container;
      ii) a second cylindrical wall extending in a second direction about said axis, said second direction being opposite to said first direction, said second cylindrical wall having a second inner surface defining a second receptacle for receiving said portion of said container, said second cylindrical wall having first and second radially inwardly projecting tabs projecting inwardly from said second inner surface for cooperating with a tab cooperating portion of said container, to form a tab alignment closure to provide a second mode of holding said apparatus on said container such that in the second mode said first and second tabs must be oriented in alignment with said tab cooperating portion for removal of said closure from said container.

2. An apparatus as claimed in claim 1 wherein said first and second radially inwardly projecting tabs are disposed on diametrically opposite sides of said second cylindrical wall.

3. An apparatus as claimed in claim 2 wherein said second receptacle has a second bottom portion and a second opening disposed in an second plane perpendicular to said axis.

4. An apparatus as claimed in claim 3 wherein at least one of said first and second radially inwardly projecting tabs has a generally arcuate shape.

5. An apparatus as claimed in claim 4 wherein said first and second radially inwardly projecting tabs each extends through an angle of approximately 20 degrees.

6. An apparatus as claimed in claim 5 wherein said first and second radially inwardly projecting tabs are relatively rigid.

7. An apparatus as claimed in claim 1 wherein said body is relatively rigid.

8. An apparatus as claimed in claim 1 wherein said groove is helical in the form of a female thread on said first cylindrical wall.

9. An apparatus as claimed in claim 1 wherein said groove is annular.

10. An apparatus as claimed in claim 9 wherein said first receptacle has a first bottom portion and wherein the groove is disposed immediately adjacent the first bottom portion.

11. An apparatus as claimed in claim 1 wherein the diameter of the first cylindrical wall is approximately the same diameter as the diameter of the second cylindrical wall.

12. An apparatus for containing material, the apparatus including:
   a) a container having a main body portion and a generally cylindrical top portion, said generally cylindrical top portion including a first generally cylindrical closure cooperating portion and a second generally cylindrical closure cooperating portion adjacent the first closure cooperating portion, the first closure cooperating portion having a first projecting bead and the second closure cooperating portion having a tab cooperating portion, said second closure cooperating portion having an access opening to an interior portion of said container; and b) a container closure including a body having an axis, the body having:
  i) a first cylindrical wall extending in a first direction about said axis and having a first inner surface defining a first receptacle for receiving said second closure cooperating portion of said container, said first inner surface having a groove therein for cooperating with said complementary bead on said first portion of said container to provide a first mode of holding said container closure on said container; and
  ii) a second cylindrical wall extending in a second direction about said axis, said second direction being opposite to said first direction, said second cylindrical wall having a second inner surface defining a second receptacle for receiving said second closure cooperating portion of said container, said second cylindrical wall having first and second radially inwardly projecting tabs projecting inwardly from said second inner surface for cooperating with said tab cooperating portion of said container to form a tab alignment closure to provide a second mode of holding said apparatus on said container such that in the second mode said first and second tabs must be oriented in alignment with said tab cooperating portion for removal of said closure form said container.

13. An apparatus as claimed in claim 12 wherein said tab cooperating portion includes a second continuous projecting bead extending arcuately about said second closure cooperating portion, said second continuous bead having first and second end portions, said first and second end portions being arcuately spaced apart to form an arcuate gap therebetween.

14. An apparatus as claimed in claim 13 wherein said first and second radially inwardly projecting tabs are disposed on diametrically opposite sides of said second cylindrical wall.

15. An apparatus as claimed in claim 14 wherein said second receptacle has a second bottom portion and a second receptacle opening disposed in a second opening plane perpendicular to said axis.

16. An apparatus as claimed in claim 15 wherein at least one of said first and second radially inwardly projecting tabs has a generally arcuate shape, said at least one of said first and second tabs being operable to pass between said first and second end portions of said second continuous bead.

17. An apparatus as claimed in claim 16 wherein said at least one of said first and second radially inwardly projecting tabs extends through an angle of approximately 20 degrees.

18. An apparatus as claimed in claim 17 wherein each of said first and second radially inwardly projecting tabs has a thickness approximately equal to the thickness of the second continuous bead.

19. An apparatus as claimed in claim 18 wherein said first and second radially inwardly projecting tabs are relatively rigid.

20. An apparatus as claimed in claim 13 wherein said body is relatively rigid.

21. An apparatus as claimed in claim 13 wherein said first closure cooperating portion has a first diameter and wherein the second closure cooperating portion has a second diameter unequal to the first diameter.

22. An apparatus as claimed in claim 21 wherein said first bead is helical to form a male thread on said first closure cooperating portion and wherein said groove is helical in the form of a female thread on said first cylindrical wall, said groove being complementary to said first bead for cooperation therewith.

23. An apparatus as claimed in claim 13 wherein said first projecting bead is annular in shape and is disposed adjacent said access opening and wherein said first groove is annular in shape and generally complementary to said bead.

24. An apparatus as claimed in claim 23 wherein said first receptacle has a first bottom portion and wherein the groove is disposed immediately adjacent the first bottom portion.

25. An apparatus as claimed in claim 21 wherein the diameter of the first cylindrical wall is approximately the same diameter as the diameter of the second cylindrical wall.

26. An apparatus as claimed in claim 25 wherein said first closure cooperating portion includes a first wall portion and said second closure cooperating portion includes a second wall portion.

27. An apparatus as claimed in claim 26 wherein said second continuous projecting bead projects radially outwardly of said second closure cooperating portion, no further than said first wall portion.

* * * * *